(No Model.)  2 Sheets—Sheet 1.
J. B. ROACH.
FERTILIZER DISTRIBUTER.
No. 566,472. Patented Aug. 25, 1896.
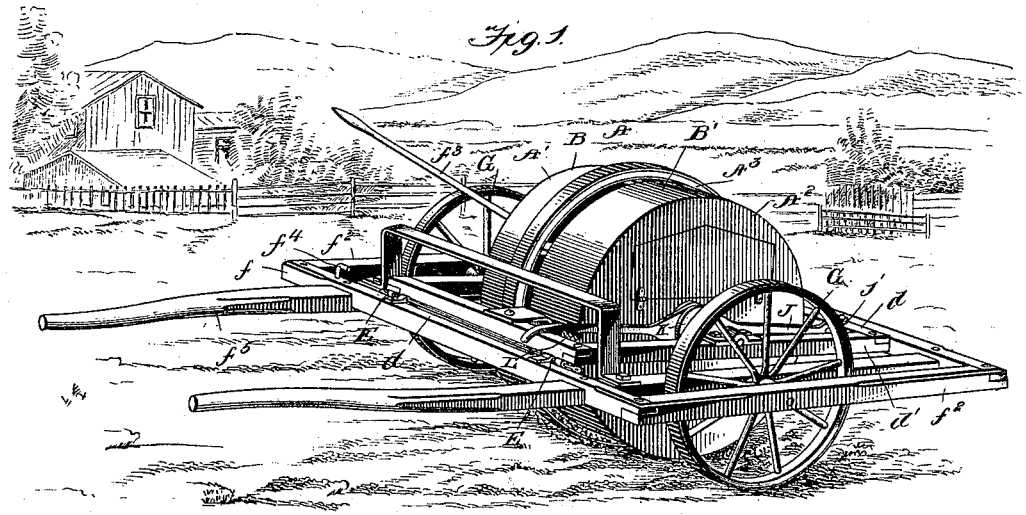
Fig. 1.
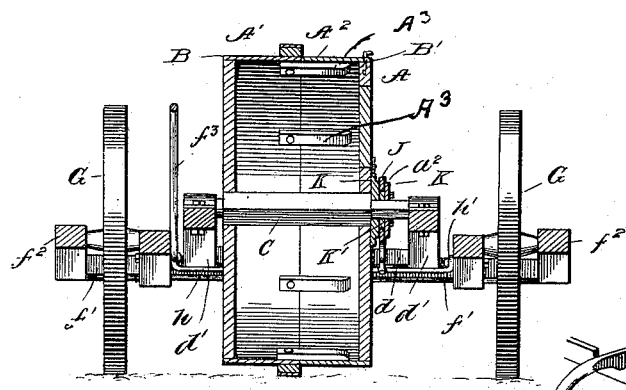
Fig. 5.
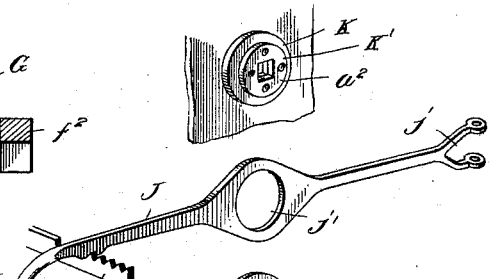
Fig. 6.
Fig. 7.
WITNESSES:
J. C. Shaw
J. Edw. Luckett
INVENTOR
J. B. Roach,
BY O'Meara & Co.
ATTORNEYS (No Model.) 2 Sheets—Sheet 2.
J. B. ROACH.
FERTILIZER DISTRIBUTER.
No. 566,472. Patented Aug. 25, 1896.
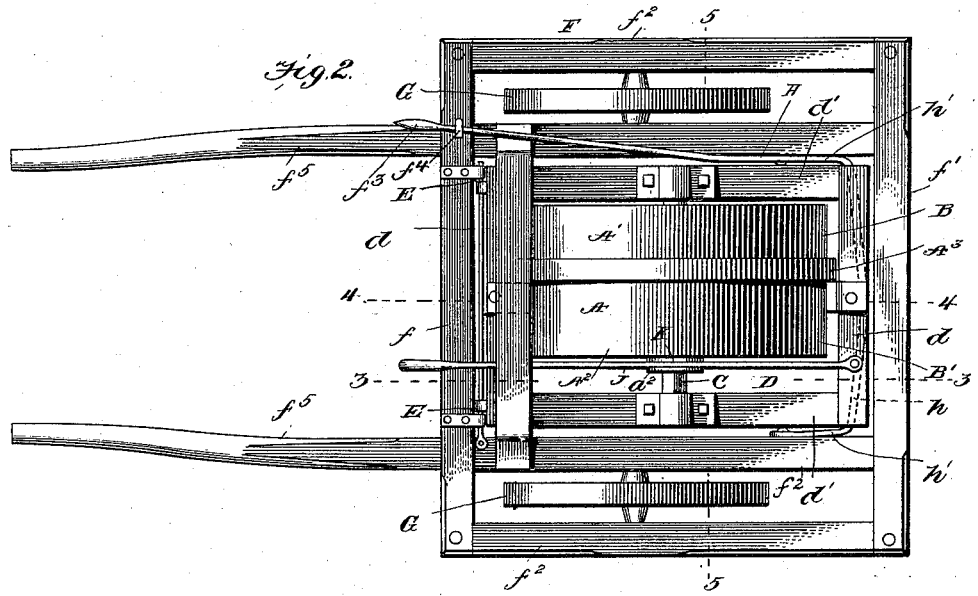
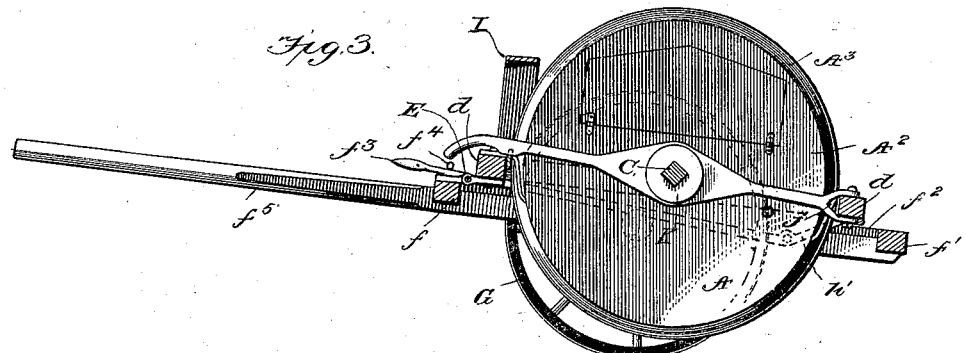
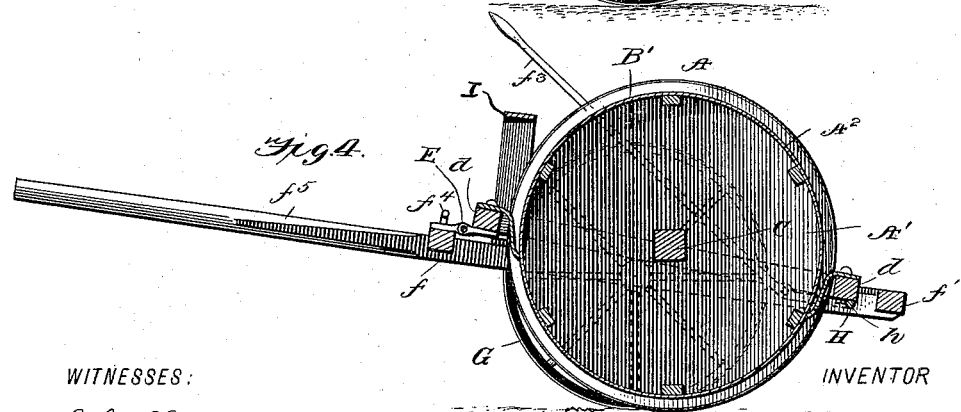
WITNESSES:
J. C. Shaw
J. Edw. Luckett
INVENTOR
J. B. Roach,
BY O'Meara & Co.
ATTORNEYS

UNITED STATES PATENT OFFICE.

JAMES BYRD ROACH, OF WAUKEENAH, FLORIDA.

FERTILIZER-DISTRIBUTER.

SPECIFICATION forming part of Letters Patent No. 566,472, dated August 25, 1896.

Application filed January 22, 1896. Serial No. 576,454. (No model.)

*To all whom it may concern:*

Be it known that I, JAMES BYRD ROACH, residing at Waukeenah, in the county of Jefferson and State of Florida, have invented a new and Improved Fertilizer-Distributer, of which the following is a specification.

My invention relates to improvements in portable manure or fertilizer distributers, and it more especially refers to a distributer of this character having a revolving drum or fertilizer-holder, a wheeled frame for supporting the holder, and means for moving such holder out of and in an operative position, and also for regulating the feed or discharge of the fertilizing material.

My invention, therefore, primarily has for its object to provide a machine of this character of a simple and economical construction in which the several parts are compactly arranged, easily manipulated, and adapted to effectively serve for their intended purposes.

A further object of my invention is to provide a fertilizer-distributing machine having the fertilizer-holder mounted upon a supplemental frame portion hinged to the main frame and provided with elevating means conveniently operated from the driver's seat, and such holder formed of two sections, one of which is adapted to be separated from the other, whereby to provide an annular discharge-opening for the fertilizer, and means for moving the movable section to or from the fixed section, also conveniently operated from the driver's seat.

With other objects in view, which will hereinafter appear, the invention consists in a machine embodying the peculiar combination and novel arrangement of parts hereinafter first described in detail and then specifically pointed out in the appended claims, reference being had to the accompanying drawings, in which—

Figure 1 is a perspective view of my improved fertilizer-distributer, the same being shown in position for use. Fig. 2 is a top plan view thereof. Fig. 3 is a vertical longitudinal section taken on the line 3 3 of Fig. 2, the drum being shown raised. Fig. 4 is a similar view taken on the line 4 4 of Fig. 2, the drum being shown lowered. Fig. 5 is a transverse section taken on the line 5 5 of Fig. 2. Fig. 6 is a detail view of the shifting-lever hereinafter referred to. Fig. 7 is a detail view of the crank or lifting-bail.

In the practical construction my invention embodies a drum or cylindrical holder A, formed, preferably, of wooden heads and galvanized rims B B'. Such drum is formed of two half-sections A' A$^2$, one of which, A', is made fast to an axle C, while the other, A$^2$, is held to slide on such shaft for a purpose presently explained.

The fixed section A' has a wooden rim A$^3$, having a metal tire, which rim is adapted to travel on the ground when the drum is lowered and thereby rotate the drum, it being understood that the shaft C, where it passes through the slidable section A$^2$ of the drum, is made non-circular, so that the said section will turn in unison with the section A'.

D indicates a supporting-frame for the drum, composed of the end beams $d$ and the side beams $d'$, which have bearings for the shaft C, as most clearly shown in Figs. 2 and 5 of the drawings. This frame D is hinged at the front end by the members E E to the main frame F, consisting of the front and rear beams $f$ and $f'$ and the side beams $f^2 f^2$, arranged in pairs, as shown, in which are journaled the short axles of the drive and supporting wheels G G, the inner ones of the side beams being extended at the front to form shafts $f^5$, as clearly shown.

H indicates a lift-bail, the construction of which is most clearly shown in Fig. 7, and consists of a transverse bail portion $h$, crank members $h'$, which are pivoted to the inner edges of the inner side beams $f^2$, and the forwardly-extending handle portion $f^3$, which is adapted to be swung down into engagement with a catch member $f^4$, disposed on the front beam of the main frame near one end of the driver's seat I, which is in the nature of a yoke member secured to the inner side beams $f^2$ and extended over the front end of the swinging frame, as shown.

By referring now more particularly to Fig. 2 of the drawings it will be seen that the cross-bail H of the lift member extends under the rear end of the drum-carrier frame and the crank members are so pivoted that when the handle portion of the bail is moved down into engagement with the catch member the said swinging frame, with the fertilizer-drum, will be elevated from the ground, as most clearly shown in Fig. 3, and thereby leave the machine in a condition to be readily carried about the field without distributing.

It will also be observed that by arranging the catch member and the handle portion of the lift-bail as shown the driver can readily release such handle member from the catch with his foot.

Referring now more particularly to Fig. 3, it will be observed that one of the sections of the fertilizing-drum has a swinging door, through which the fertilizer may be entered into the drum.

It will also be seen that the fixed member A' of the drum has a series of guide-fingers A³ projected into the movable section A² to guide same as it is moved to or from the fixed section. As a convenient means for moving the movable section A² so as to increase or decrease the annular discharge-opening I provide a shifting-lever J, made of spring-steel and having its rear end bifurcated, as at $j$, whereby it is adapted to be pivotally connected with the rear cross-bar of the swinging frame and admit of its being swung horizontally. About midway its length the said bar J is apertured, as at $j'$, and fits an annular grooved hub member $a^2$, secured to the section A², such member being preferably formed of two outer disks K K and an inner disk K', which disks are centrally apertured, whereby to slip onto the non-circular shaft C, and are adapted to be secured to each other and to the section A² by bolts or screws, as shown.

The front end of the lever J is held in engagement with a rack portion L, secured to the front cross-beam of the swinging frame and having ratchet-teeth, as shown, the extreme front end of such lever being projected beyond the driver's seat and so disposed that the driver with his foot or with his knee or by hand can shift the lever J to move the drum-section A² to increase or diminish the size of the annular discharge-opening. By making the lever J of spring-steel it is manifest that by pulling the end of the lever J inward to close the section A² toward the section A', should clods of the manure or other fertilizer material prevent the said section A² from closing up, a spring-tension will be effected on the said lever J, which, as soon as the said clod begins to break or becomes loosened from the edge of the section A², will force such section A² to a closed position.

M indicates scrapers at the front and rear ends of the swinging frame which serve to clear the edge of the section A² of fertilizer material.

From the foregoing description, taken in connection with the accompanying drawings, it is thought the complete operation and the advantages of my invention will be readily apparent, the same being very simple in its construction, as the parts are so arranged that the driver, although having both hands employed to guide the team, can with his feet manipulate to release the lift device and adjust the movable section to feed more or less material as may be desired.

It is manifest the details of construction of the main and the swinging frame and driver's seat may be varied without departing from my invention.

Having thus described my invention, what I claim, and desire to secure by Letters Patent, is—

1. An improved fertilizer-distributing machine comprising a main frame having supporting or drive wheels and a supplemental frame hinged at the front end to the main frame, a rotary drum carried by the supplemental frame having a discharge-opening, a lifting-bail pivotally connected with the main frame having a lift member adapted to engage the rear end of the swinging frame and the operating-handle portion projected forward adjacent the driver's seat and adapted to be moved to a release position by the driver's foot substantially as shown and described.

2. In a fertilizer-distributing machine as described, a rotary fertilizer-holding disk formed of two sections, one of which is fixedly connected to the shaft, the other held to slide upon the shaft to or from the fixed section and the operating-lever for moving such section upon the said shaft having its front end projected below and beyond the driver's seat substantially as shown and for the purposes described.

3. In a fertilizer-distributing machine as described, a distributing-drum having a rotary-shaft portion and formed of two sections one of which is fixedly secured to the said shaft and provided with an annular tread portion or flange, the other being held to slide on the shaft to or from the fixed section, a lever formed of spring metal having a clutch portion to engage the movable drum-section fulcrumed at its rear end to move sidewise and having its front end projected in close relation to the driver's seat and a rack mechanism carried by the drum-supporting frame to engage the front end of such lever substantially as shown and for the purposes described.

4. In a fertilizer-distributing machine, the combination with the main frame, the swinging frame and the lift-bail H, having a transverse portion $h$, crank members $h'$, and the annular portion $h^2$, arranged as shown of a fertilizer-drum supported on a swinging frame having an axle member held to rotate on such frame, a fixed portion A', having annular flange and horizontally-projected guides, a movable member A², held to slide on the shaft having a grooved hub member and a lever held to engage such member pivoted at its rear end to the swinging frame and having its front end in close relation to the driver's seat, a rack or detent on the swinging frame to engage said front end of the lever all arranged substantially as shown and described.

5. In a fertilizer-distributing machine as described, a fertilizer-holding drum having a shaft held to rotate on the drum-carrying frame, said drum consisting of a section $A'$, fixedly held on the shaft closed at one end and open at the other and provided with an annular or tread portion and horizontally-projected fingers or guides at the open end and the movable member $A^2$, closed at the outer end and open at the inner end and adapted to fit over the said guides, said section $A^2$, having a hub or clutch member and the laterally-movable lever engaging such clutch member having its front end disposed in close relation to the driver's seat as set forth.

JAMES BYRD ROACH.

Witnesses:
T. L. CLARKE,
J. C. BARCLAY.